(12) United States Patent
Kaufmann et al.

(10) Patent No.: US 12,273,136 B2
(45) Date of Patent: Apr. 8, 2025

(54) ANTENNA ASSEMBLY, RECEIVER ASSEMBLY, COMMUNICATION METHODS FOR THE SAME AND SYSTEM

(71) Applicant: u-blox AG, Thalwil (CH)

(72) Inventors: Thomas Kaufmann, Thalwil (CH); Timo Saarnimo, Thalwil (CH)

(73) Assignee: u-blox AG, Thalwil (CH)

( * ) Notice: Subject to any disclaimer, the term of this patent is extended or adjusted under 35 U.S.C. 154(b) by 386 days.

(21) Appl. No.: 17/713,658

(22) Filed: Apr. 5, 2022

(65) Prior Publication Data
US 2022/0337277 A1    Oct. 20, 2022

(30) Foreign Application Priority Data
Apr. 16, 2021    (EP) ..................................... 21168923

(51) Int. Cl.
*H04B 1/18*    (2006.01)
*H04B 1/04*    (2006.01)
*H04B 1/16*    (2006.01)

(52) U.S. Cl.
CPC ............. *H04B 1/18* (2013.01); *H04B 1/0458* (2013.01); *H04B 1/1607* (2013.01)

(58) Field of Classification Search
CPC ...... H04B 1/18; H04B 1/0458; H04B 1/1607; H04B 1/16; H04B 1/40; H04Q 1/36; H04Q 1/241; H04Q 23/00
USPC ..................................................... 455/552.1
See application file for complete search history.

(56) References Cited

U.S. PATENT DOCUMENTS

| | | | |
|---|---|---|---|
| 6,618,648 B1 * | 9/2003 | Shirota | H02H 7/263 700/286 |
| 2017/0294930 A1 | 10/2017 | Langbein et al. | |
| 2018/0152898 A1 * | 5/2018 | Gossner | H04B 1/18 |
| 2020/0290567 A1 * | 9/2020 | Funyak | B60R 25/102 |

FOREIGN PATENT DOCUMENTS

| | | |
|---|---|---|
| EP | 2983298 | 2/2016 |
| EP | 3331316 | 6/2018 |

OTHER PUBLICATIONS

EP Extended Search Report in European Appln. No. 21168923.7, dated Oct. 12, 2021, 7 pages.

* cited by examiner

*Primary Examiner* — Eugene Yun
(74) *Attorney, Agent, or Firm* — Fish & Richardson P.C.

(57) ABSTRACT

The disclosure relates to an antenna assembly, a receiver assembly, communication methods for the same and a system. The antenna assembly comprises a signal line for connecting the antenna assembly to a single line communication cable. The antenna assembly further comprises an antenna, arranged to receive a radio frequency signal and to apply the radio frequency signal to the signal line of the antenna assembly. The antenna assembly further comprises an antenna multiplexer, arranged to separate a superimposed signal from the radio frequency signal on the signal line, wherein the superimposed signal comprises a supply voltage for the antenna assembly and a communication signal. The antenna assembly further comprises an antenna controller, arranged to receive the communication signal and to perform a monitoring and/or a control operation in response to the communication signal.

14 Claims, 2 Drawing Sheets

ANTENNA ASSEMBLY, RECEIVER ASSEMBLY, COMMUNICATION METHODS FOR THE SAME AND SYSTEM

CROSS-REFERENCE TO RELATED APPLICATIONS

This application claims priority to European Application No. EP21168923.7, filed on Apr. 16, 2021, the contents of which are incorporated herein by reference in their entirety.

The present disclosure relates to an antenna assembly, a communication method for an antenna assembly, a receiver assembly, a communication method for a receiver assembly and a system comprising such antenna assembly and receiver assembly.

Systems with an antenna and a receiver, whereby the antenna is arranged to receive and/or transmit a communication signal and the receiver is arranged to process the received and/or to be transmitted communication signals, are widely known in the art. Since challenges for wireless communication have rapidly increased within the last years, requirements for such antennas and receivers have also steadily developed. To satisfy such high requirements, such receiver and antenna need improvement.

It is an object of the present disclosure to present an improved antenna assembly, an improved receiver assembly, improved communication methods for the same, and an improved system with such antenna assembly and receiver assembly.

The above-mentioned object is solved by the subject-matter of the attached independent claims. Further embodiments are disclosed in the attached dependent claims.

According to a first aspect of the disclosure, an antenna assembly comprises a signal line for connecting the antenna assembly to a single line communication cable and an antenna, arranged to receive a radio frequency signal and to apply the radio frequency signal to the signal line of the antenna assembly. The antenna assembly further comprises an antenna multiplexer, arranged to separate a superimposed signal from the radio frequency signal on the signal line, wherein the superimposed signal comprises a supply voltage for the antenna assembly and a communication signal. Moreover, the antenna assembly comprises an antenna controller, arranged to receive the communication signal and to perform a monitoring and/or a control operation in response to the communication signal.

With such antenna assembly it is achieved that an improved communication between such antenna assembly and a receiver assembly, to which such antenna assembly is connected to via the single line communication cable, is provided. This can be used in systems, in which the antenna assembly is located spatially distanced from a receiver assembly. According to the first aspect, the communication between the antenna assembly and a receiver assembly can therefore include, for example, safety-relevant or functional information and/or instructions. Thereby, additional intelligence is added to such antenna assembly.

The signal line of the antenna assembly is arranged to carry a radio frequency signal, which is received or to be transmitted by the antenna assembly. The single line communication cable is, for example, a coaxial cable, via which the antenna assembly is connected to a receiver assembly, wherein a shield of the coaxial cable can be used as a return path. Furthermore, with the antenna assembly according to the first aspect, it is achieved that the single line communication cable, used herein to connect the antenna assembly to a receiver assembly, complies with a standard cable, which is usually used between an active antenna assembly and a receiver assembly. Therefore, existing solutions for connecting the antenna assembly to the single line communication cable and existing cables between the antenna assembly according to the first aspect and a connected receiver assembly may be used, which ensures a low cost for such antenna assembly. For example, the single line communications cable may be attached to an electronic board of the antenna assembly, thereby connecting the signal line of the antenna assembly to the single line communications cable. Other connections are of course also possible.

According to at least one embodiment, the monitoring and/or control operation comprises: determining a status of the antenna assembly, generating a further communication signal based on the determined status in response to the communication signal, and sending the further communication signal via the single line communication cable to a receiver assembly.

With such embodiment it is achieved that further intelligence and functionality is added to the antenna assembly. The antenna controller, after receiving the communication signal, is arranged to determine a status of the antenna assembly. The antenna controller may be in particular arranged to determine such status based on the received communication signal. For example, if a certain status of the antenna assembly is polled via the communication signal, or the communication signal requests information from the antenna assembly which is based on such status, the antenna controller determines a corresponding status of the antenna assembly. The antenna controller is further arranged to respond to such request by communicating the determined status to a receiver assembly via the further communication signal. Thereby, a communication between the antenna assembly and an attached receiver assembly is further improved.

According to at least one embodiment, the antenna assembly further comprises at least one of the following:
a non-volatile memory, arranged to store an authentication code of the antenna assembly,
a temperature sensor, arranged to measure a temperature of at least one part of the antenna assembly,
a current and/or voltage sensor, arranged to measure a current and/or voltage supplied to at least one part of the antenna assembly, and
a signal input power sensor, arranged to measure a signal input power provided to at least one part of the antenna assembly.

With the antenna assembly having a non-volatile memory that is arranged to store an authentication code of the antenna assembly it is achieved that, with such authentication code, the antenna assembly may be authenticated by a receiver assembly, to which the antenna assembly is connected. This allows a secure pairing between the antenna assembly and a connected receiver assembly, guaranteeing that the antenna assembly, which is connected to the receiver assembly, has proper characteristics. Thereby, tampering protection is provided due to the possibility to detect a use of wrong, e.g., aftermarket antennas.

With the antenna assembly having a temperature sensor, arranged to measure a temperature of at least one part of the antenna assembly, it is achieved that it may be ensured that the antenna assembly is within operational temperature-limits. Moreover, hereby temperature models may be implemented for low noise amplifier, LNA, gain drift to more reliably detect jamming and spoofing at the antenna assembly, for example by detecting excessive in-band noise increase due to a spoofing transmitter. Additionally, a temperature drift of surface acoustic wave, SAW, filters can be compensated with appropriate models in a connected receiver assembly, wherein the receiver assembly may communicate, via the communication signal, to the antenna assembly to perform a control operation to compensate said temperature drift. Also gain variations of the LNA gain over temperature may be monitored, whereby jammer detection algorithms may be improved. Furthermore, lifetime-monitoring of component degradation may be thereby provided.

With the antenna assembly having a current and/or voltage sensor, arranged to measure a current and/or voltage supplied to at least one part of the antenna assembly, it is achieved that for example current and/or voltage of LNAs in the antenna assembly may be measured and monitored to ensure that all amplifiers operate nominally. Furthermore, lifetime-monitoring of component degradation may be thereby provided.

With such antenna assembly having a signal input power sensor, arranged to measure a signal input power provided to at least one part of the antenna assembly, it is achieved that, for example, LNAs may be detected that may potentially go into compression, caused by interference, or that critical power levels for SAW filters may be detected, which may indicate potential faults. Hereby, lifetime-monitoring of component degradation may be provided as well.

All of the above options, each on its own, or some or all in combination, provide the antenna assembly with additional intelligence, which can be polled by and/or communicated to a connected receiver assembly, wherein it allows such connected receiver assembly to assess received information and/or provide instructions to the antenna assembly, via further communication signals, to react to said information with respective control operations. This further improves the communication between the antenna assembly and a connected receiver assembly.

According to at least one embodiment, if the antenna assembly is connected via the single line communications cable to a receiver assembly, which is arranged to send the communication signal and to receive a further communication signal, the antenna assembly is arranged to communicate with the receiver assembly via the communication signal and the further communication signal, and if the antenna assembly is connected via the single line communications cable to a receiver assembly, which is not arranged to send the communication signal and to receive the further communication signal, the antenna assembly is arranged to be used as an antenna assembly that does not communicate with the receiver assembly via the communication signal and the further communication signal.

Hereby, a backward compatibility with older or otherwise limited receiver assemblies, which may lack controllers or other communication devices, via which the superimposed signal could be provided to the antenna assembly, is achieved. The antenna assembly may, even if connected to such older or otherwise limited receiver assembly, still be used as an active antenna assembly for such receiver assembly.

According to a second aspect of the disclosure, a communication method for an antenna assembly, wherein a signal line of the antenna assembly is connected to a single line communication cable, comprises:
    receiving, by an antenna, a radio frequency signal;
    applying, by the antenna, the radio frequency signal to the signal line of the antenna assembly;
    separating, by an antenna multiplexer, a superimposed signal from the radio frequency signal on the signal line, wherein the superimposed signal comprises a supply voltage for the antenna assembly and a communication signal;
    receiving, by an antenna controller, the communication signal; and
    performing, by the antenna controller, a monitoring and/or a control operation in response to the communication signal.

Advantages and embodiments of the second aspect correspond, in general, to the advantages and embodiments of the first aspect.

According to a third aspect of the disclosure, a receiver assembly, comprises a receiver connector for connecting a signal line of the receiver assembly to a single line communication cable. The receiver assembly further comprises a receiver controller, arranged to generate a communication signal comprising instructions regarding a monitoring and/or a control operation for an antenna assembly. The receiver assembly further comprises a receiver voltage supply, arranged to provide a supply voltage for the antenna assembly via the receiver connector. Additionally, the receiver assembly comprises a receiver radio frequency circuit, arranged to receive, via the signal line, and process a radio frequency signal. Furthermore, the receiver assembly comprises a receiver multiplexer, arranged to superimpose the supply voltage and the communication signal onto the radio frequency signal on the signal line of the receiver assembly.

With such receiver assembly it is achieved that an improved communication between the receiver assembly and an antenna assembly, to which such receiver assembly is connected to via the single line communication cable, is provided. This can be used in systems, in which an antenna assembly is located spatially distanced from the receiver assembly. The receiver voltage supply may be, for example, a voltage supply unit of the receiver, or an arrangement that uses voltage supplied by an external voltage supply unit. According to the third aspect, the communication between the receiver assembly and an antenna assembly can therefore include, for example, safety-relevant or functional information. The receiver assembly may, for example, poll information from a connected antenna assembly in order to monitor a functionality thereof, or may send the communication signal to a connected antenna assembly in order to orchestrate control operations of such antenna assembly.

According to at least one embodiment, the receiver multiplexer is further arranged to separate a further communication signal from the radio frequency signal on the signal line.

Hereby it is achieved that the receiver assembly, in this case, is further arranged to receive and process such further communication signal, which may comprise information regarding a monitoring or any functionality of an attached antenna assembly, for example in form of a response to the communication signal sent by the receiver assembly.

According to at least one embodiment, the receiver voltage supply is provided as a part of the receiver controller.

Hereby it is achieved that the receiver assembly is provided in a compact form, wherein no additional units are required for providing the supply voltage.

According to at least one embodiment, if the receiver assembly is connected via the receiver connector to an antenna assembly, which is arranged to process the communication signal and to send a further communication signal, the receiver assembly is arranged to communicate with the antenna assembly via the communication signal and the further communication signal, and if the receiver assembly is connected via the receiver connector to an antenna assembly, which is not arranged to process the communication signal and to send the further communication signal, the receiver assembly is arranged to be used as a receiver assembly that does not communicate with the antenna assembly via the communication signal and the further communication signal.

A backward compatibility with older or otherwise limited antenna assemblies, which may lack suitable functionality for an improved communication, is hereby achieved. The receiver assembly may, even if connected to such older or otherwise limited antenna assembly, still use such antenna assembly as active antenna assembly to receive or transmit the radio frequency signal.

Further advantages and embodiments of the third aspect correspond, in general, to the advantages and embodiments of the first and second aspect and vice versa.

According to a fourth aspect, a communication method for a receiver assembly, wherein a signal line of the receiver assembly is connected via a receiver connector to a single line communication cable, comprises:

generating, by a receiver controller, a communication signal comprising instructions regarding a monitoring and/or a control operation for an antenna assembly;

providing, by a receiver voltage supply, a supply voltage for the antenna assembly via the receiver connector;

receiving and processing, by a receiver radio frequency circuit, a radio frequency signal, wherein the radio frequency signal is received via the signal line; and adding, by a receiver multiplexer, the supply voltage and the communication signal onto the radio frequency signal on the signal line of the receiver assembly.

Advantages and embodiments of the fourth aspect correspond, in general, to the advantages and embodiments of the third aspect, as well as the first and second aspect, and vice versa.

According to a fifth aspect of the disclosure, a system comprises the receiver assembly according to the third aspect and the antenna assembly according to the first aspect, wherein the receiver assembly and the antenna assembly are connected via a single line communication cable.

An improved communication between the antenna assembly and the receiver assembly is hereby achieved. The improved communication is discussed in detail above with regard to the antenna assembly and the receiver assembly, respectively.

According to at least one embodiment, the antenna assembly and the receiver assembly communicate via the single line communication cable according to a bi-directional single wire communication.

A simple and effortless communication between the antenna assembly and the receiver assembly is provided hereby.

According to at least one embodiment, the antenna assembly is arranged spatially distanced from the receiver assembly. The antenna assembly may be spatially distanced from the receiver assembly by at least 0.1 meter.

In particular in such system, in which the antenna assembly is spatially distanced from the receiver assembly, the improved communication discussed above can be used. Here, for example an authentication of the antenna assembly by the receiver assembly or a monitoring of the proper function of the antenna assembly and the radio frequency path by the receiver assembly or a controlling of the antenna assembly can be used in order to ensure a proper functioning and a high level of security in such system.

Further advantages and embodiments of the fifth aspect correspond, in general, to the advantages and embodiments of the first to fourth aspect and vice versa.

Further embodiments and advantages are disclosed in the attached dependent claims, the figures and the description thereof. In the figures, the disclosure is presented with respect to a Global Navigation Satellite System, GNSS, to which the aspects of the disclosure may be applied. This example is chosen for a consistent and easily understandable presentation of the disclosure. The disclosure, however, is not limited in this regard.

Figure 1:
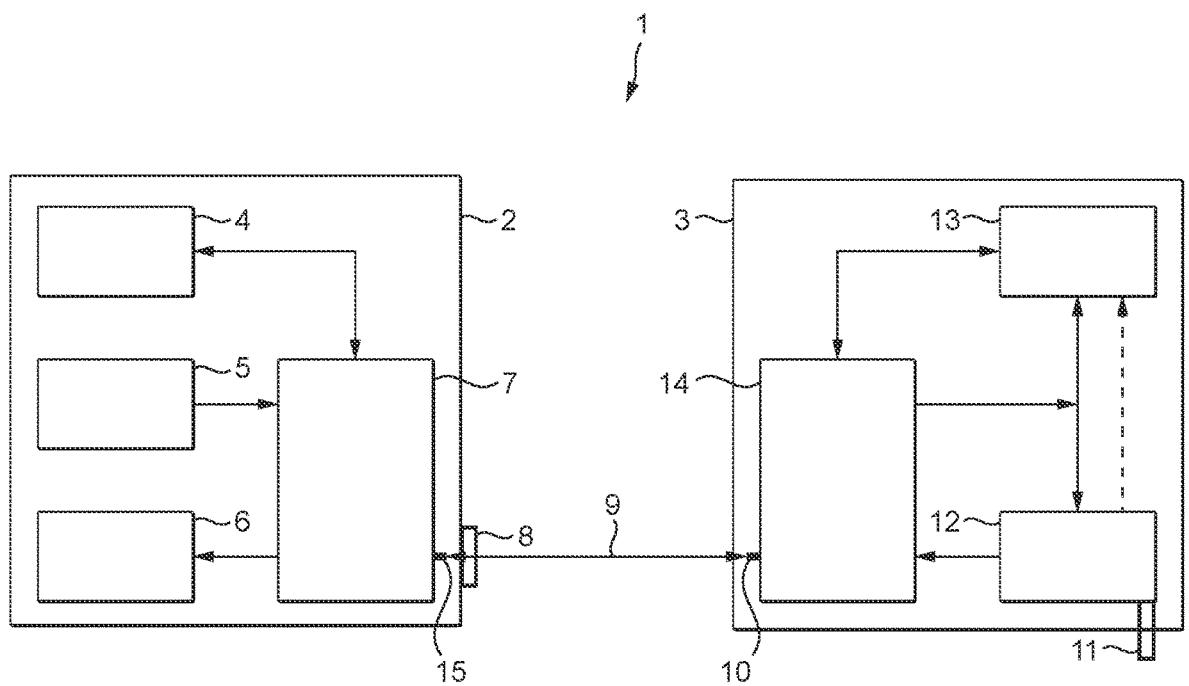
FIG. 1 shows a schematic view of a system according to one example embodiment of the disclosure.

FIG. 1 shows a system 1 comprising a receiver assembly 2 and an antenna assembly 3 according to one example embodiment of the disclosure. The antenna assembly 3 and the receiver assembly 2 are spatially distanced from each other, in this case at least 0.1 meter from each other. In this system 1 according to FIG. 1, an improved communication between the receiver assembly 2 and the antenna assembly 3 is provided, which brings several advantages, discussed herein. The system 1, in this example, is a GNSS system 1 to receive a GNSS signal. However, the disclosure hereof may similarly also be applied to other systems.

The receiver assembly 2 comprises a receiver controller 4, a receiver voltage supply unit 5 and a GNSS receiver radio frequency circuit 6. Moreover, the receiver assembly 2 comprises a receiver multiplexer 7. The receiver multiplexer 7 is electrically connected to each of the receiver controller 4, the receiver voltage supply unit 5 and the GNSS receiver radio frequency circuit 6. Additionally, the receiver multiplexer 7 is electrically connected to a receiver connector 8, via which the receiver assembly is electrically connected to a single line communication cable 9.

The receiver controller 4 is arranged to generate a communication signal comprising instructions regarding a monitoring and/or a control operation for the antenna assembly 3. The receiver controller 4 is in this example a controller, which supports a communication according to the 1-wire standard. However, any other type of communication is of course also possible. Further, according to the example shown in FIG. 1, the receiver controller 4 is arranged to communicate as a host in a client-host system. Also here, of course, other implementations are possible.

The receiver controller 4 supports a digital input and output, which is routed to the GNSS receiver radio frequency circuit 6 via the multiplexer 7. Alternatively, the digital input and output may also be routed to an external host, not shown herein.

The receiver voltage supply unit 5 is arranged to provide a direct current, DC, bias supply voltage for the antenna assembly 3. The supply voltage is provided to the antenna assembly 3 via the single line communication cable 9. Active parts of the antenna assembly 3 are supplied with this supply voltage. In this example, the receiver voltage supply unit 5 has a maximum current limiting function.

The GNSS receiver radio frequency circuit 6 is arranged to receive, via a signal line 15 of the receiver assembly 2, and to process a radio frequency signal, which is provided to the receiver assembly 2 by the antenna assembly 3 via the single line communication cable 9.

The receiver multiplexer 7 is arranged to superimpose the supply voltage, provided by the receiver voltage supply unit 5, and the communication signal, generated by the receiver controller 4, onto the radio frequency signal on the signal line 15 of the receiver assembly 2. This signal line 15 of the receiver assembly 2, is connected to the single line communication cable 9 and is arranged to carry the radio frequency signal provided by the antenna assembly 3. Additionally, the signal line 15 is arranged to carry the superimposed signal, which comprises the supply voltage and the communication signal. In the example shown in FIG. 1, the radio frequency signal is an incoming signal at the receiver assembly 2, the superimposed signal is an outgoing signal, sent to the antenna assembly 3. The superimposed signal and the radio frequency signal are transmitted according to a half-duplex communication.

In one example, the receiver multiplexer 7 may be implemented as a combiner connected to a bias-T, wherein the combiner adds the communication signal from the receiver controller 4 to the supply voltage and the bias-T passes the superimposed signal to the radio frequency signal.

The antenna assembly 3 comprises a signal line 10 of the antenna assembly 3, which is connected to the single line communication cable 9. The antenna assembly 3 further comprises an antenna 11, which is arranged to receive a GNSS radio frequency signal and to apply the radio frequency signal via a GNSS antenna radio frequency circuit 12 to the signal line 10 of the antenna assembly. The antenna assembly further comprises an antenna controller 13 and an antenna multiplexer 14. The antenna multiplexer 14 is electrically connected to the antenna controller 13 and the GNSS antenna radio frequency circuit 12. The signal lines 10 and 15, as shown in FIG. 1, are symbolic for those signal lines 10, 15 of the antenna assembly 3 and the receiver assembly 2. In general, all signal lines in the respective assembly 2, 3 that carry the respective signals, are to be understood as respective signal lines 10, 15.

The antenna multiplexer 14 is arranged to separate the superimposed signal received via the single line communication cable 9 from the radio frequency signal, which is put on the signal line 10. Furthermore, the antenna multiplexer 14 is additionally arranged to separate the supply voltage from the communication signal of the superimposed signal. The radio frequency signal, in this case, is an outgoing signal from the antenna assembly 3. The superimposed signal is an incoming signal, received by the antenna assembly 3 from the receiver assembly 2.

The supply voltage, which is separated by the antenna multiplexer 13, is used to supply voltage to active parts of the antenna assembly 3. The supply voltage is supplied to the antenna controller 13 and the GNSS antenna radio frequency circuit 12, thereby powering those entities. The supply voltage may of course also be applied to further entities of the antenna assembly 3 not shown herein.

The communication signal is distributed to the antenna controller 13. The antenna controller 13 is arranged to receive the communication signal and to perform a monitoring and/or a control operation in response to the instructions comprised in the communication signal. The antenna controller 13 is in this example a controller, which supports a communication according to the 1-wire standard. However, any other type of communication is of course also possible. The antenna controller 13 supports a communication, which is also supported by the receiver controller 4, such that both controllers 4, 13 can communicate with each other via the communication signal. As mentioned above, the receiver voltage supply unit 5 has a maximum current limiting function. Therefore, in this example, the antenna controller 13 can respond to the receiver controller 4 by sending low state pulses back to the receiver assembly 2.

Further, according to the example shown in FIG. 1, the antenna controller 13 is arranged to communicate as a client in a client-host system, responding to the signaling provided by the antenna controller 13, which is the corresponding host. Also here, of course, other implementations are possible. The antenna controller 13 supports a digital input and output and is implemented, for example, in form of a micro controller unit, MCU. As such MCU, for example, a low-cost 8-bit micro controller unit may be used.

In one example, the antenna multiplexer 14 may be implemented as a bias-T, which separates the superimposed signal from the radio frequency signal, connected to a low-pass, LP, filter, which passes the supply voltage to the active parts of the antenna assembly 3, thereby separating the supply voltage from the communication signal. The LP filter, however, could also be replaced with a rectifier that passes current only in one direction.

The antenna controller 13 is further arranged to generate a response signal in response to the received communication signal. The response signal is generated, for example, based on the monitoring and/or control operation that was instructed to be performed by the receiver assembly 2. Details and examples of such monitoring and control operations are discussed below. The antenna multiplexer 14 is further arranged to superimpose the response signal onto the radio frequency signal, thereby sending the response signal to the receiver assembly.

The receiver multiplexer 7 is arranged to separate the response signal from the radio frequency signal and to provide the response signal to the receiver controller 4, which is arranged to process the response signal.

The antenna assembly 3 may further comprise a non-volatile memory, not explicitly shown in FIG. 1, which is arranged to store an authentication code of the antenna assembly. This way, an authenticity of the antenna assembly 3 may be verified. For example, the receiver controller 4 receives instructions to authenticate the attached antenna assembly 3. The receiver controller 4 generates a corresponding communication signal, with which an authentication code of the antenna assembly 3 shall be polled. The communication signal is provided, as discussed in detail above, to the antenna controller 13.

The antenna controller 13 accesses, in response to the receiver's communication signal, the non-volatile memory and sends in the response signal the requested authentication code of the antenna assembly 3. The receiver controller receives the authentication code and can thereby verify an authenticity of the antenna assembly or forward the code to another entity to do so. Thereby, in case a wrong authentication code or no authentication code at all is received at the receiver controller 4, it can be determined that a wrong and may be fraudulent antenna is attached. This authentication may be performed, for example, at power up of the system 1. With this authentication, for example at least one of a type, a serial number, an encryption code, etc. of the antenna may be authenticated.

The antenna assembly 3 may further comprise a temperature sensor, not explicitly shown in FIG. 1, which is arranged to measure a temperature of at least one part of the antenna assembly 3. For example, the temperature sensor is arranged to measure a temperature of SAW filters or of LNAs or other parts of the antenna assembly 3. In this case, for example, the receiver controller 4 may poll a current temperature of the SAW filters. The monitored temperature is then provided to the receiver controller 4, similarly to the providing of the authentication code discussed above. The receiver controller 4 is then arranged to compensate, with appropriate models, a temperature drift of the SAW filters. Similarly, also temperature models for LNA gain drift may be implemented to more reliably detect impairment due to jamming and/or spoofing. The monitoring of a temperature in the antenna assembly 3 may also be used to detect component degradation over long-time use, for example over decades.

The antenna assembly 3 may further comprise a current and/or voltage sensor, not explicitly shown in FIG. 1, which is arranged to measure a current and/or voltage supplied to at least one part of the antenna assembly 3. This way, a current and/or voltage of LNAs in the antenna assembly 3 may be measured and monitored to ensure that all amplifiers operate nominally. The monitoring of the current and/or voltage is performed analogously to the monitoring of the temperature discussed above.

The antenna assembly 3 may further comprise a signal input power sensor, not explicitly shown in FIG. 1, which is arranged to measure a signal input power provided to at least one part of the antenna assembly. This can be used to detect whether the LNA is going into compression (interference), or to detect critical power levels for SAW filters indicating potential faults. The monitoring of the signal input power is performed analogously to the monitoring of the temperature discussed above.

Furthermore, the above-discussed communication between the antenna assembly 3 and the receiver assembly 2 may be used to perform additional antenna control. For example, an amplifier operating point may be defined or changed by setting operational bias current points or bias voltage for the LNA, an amplifier gain may be defined or changed, and even an operating frequency of the antenna element may be changed, for example between L2 frequency band and L5 frequency band or other band operation. Moreover, it may be used for adaptive matching to radio frequency environment, i.e., switching between frequency offsets to re-tune the antenna to a changing environment.

After power up, during normal GNSS reception, the communication between the receiver controller 4 and the antenna controller 13 can operate generally at a very low rate, for example once a second, unless GNSS reception is for example lost. During such loss of reception, in a no GNSS signal state, for example in a GNSS-denied area, authentication and monitoring can be more frequent.

The antenna assembly 3 may comprise one or more of the above-mentioned additional elements (memory and sensors), according to which additional intelligence may be added to the system 1 by real-time system monitoring of crucial components. Moreover, the memory or sensors may be part of the antenna controller 13 or may be separate entities in the antenna assembly 3.

Figure 2:
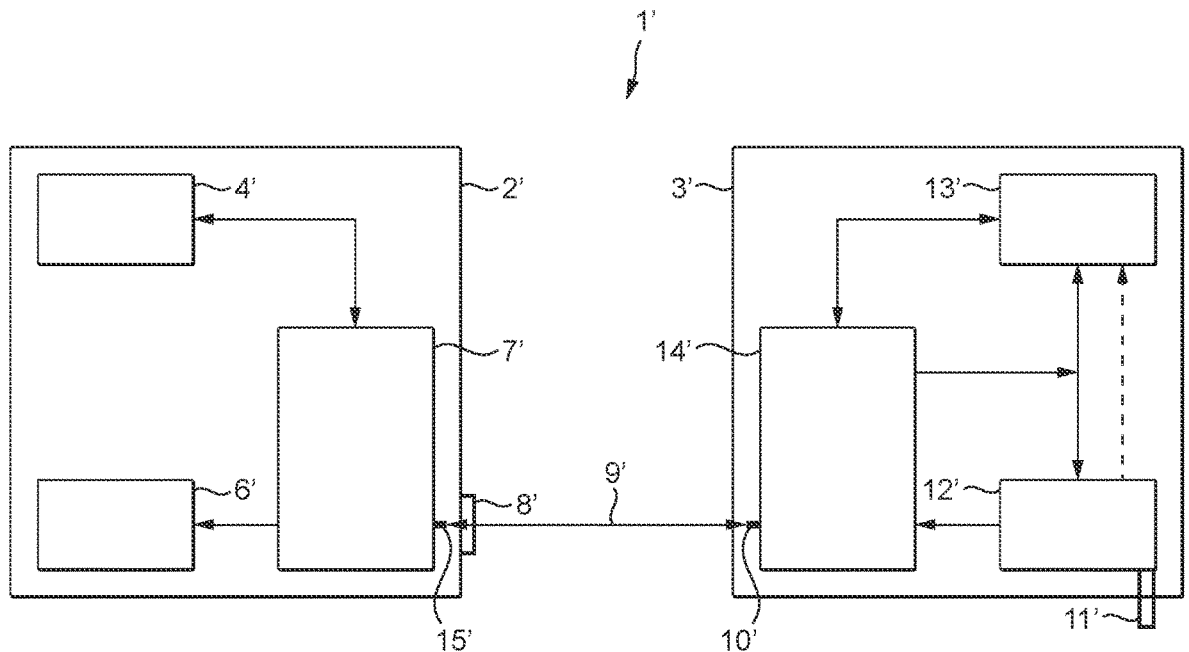
FIG. 2 shows a schematic view of a system according to another example embodiment of the disclosure.

FIG. 2 shows a schematic view of a system 1' according to another embodiment of the disclosure. The system 1' of FIG. 2 corresponds mainly with the system 1 shown in FIG. 1. With respect to FIG. 2, only the differences between the system 1' and the system 1 are discussed. Same parts of the system 1' are not mentioned herein again.

In system 1', a receiver controller 4' is used, which also provides a supply voltage for an attached antenna assembly 3'. Therefore, in the embodiment of FIG. 2, no additional receiver voltage supply unit is required. The receiver controller 4' either provides the supply voltage and a communication signal separately, which then are superimposed by a receiver multiplexer 7', or already provides the supply voltage and the communication signal as superimposed signal, in which case the receiver multiplexer 7' only needs to add the superimposed signal onto a signal line 15' of the receiver assembly 3'. In such embodiment, the receiver multiplexer 7' may be of reduced complexity, for example merely a bias-T.

In yet another embodiment, not shown in the figures, the receiver controller and the GNSS receiver radio frequency circuit may be an integrated entity, e.g., by using a universal asynchronous receiver transmitter, UART, port with complementary metal-oxide-semiconductor, CMOS, signal levels at the GNSS receiver radio frequency circuit.

In yet another embodiment, not shown in the figures, the receiver voltage supply unit of the receiver assembly can also perform detection of the bias current/voltage states of the antenna assembly 3, 3': open state (no current drain), short circuit state (current limitation or low voltage output) and normal bias current state (bias current within high and low limits). This information can be provided to an external host or the GNSS receiver radio frequency circuit as digital signals.

Figure 3:
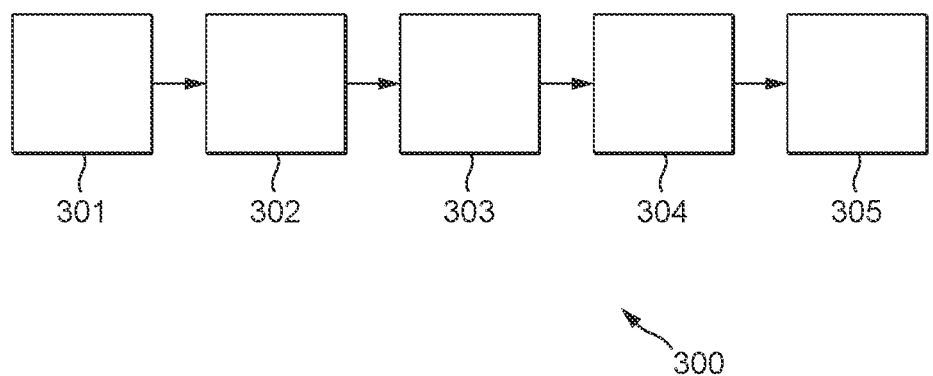
FIG. 3 shows a flowchart of a communication method according to one example embodiment of the disclosure.

FIG. 3 shows a flowchart of a communication method 300 according to one embodiment of the disclosure. The communication method according to FIG. 3 can be applied to the antenna assembly 3, 3' of FIGS. 1 and 2.

In a step 301, a radio frequency signal is received by an antenna. In a step 302, the radio frequency signal is applied by the antenna to a signal line of the antenna assembly, which signal line is connected to a single line communication cable.

In a step 303, a superimposed signal, received via the single line communications cable, is separated by an antenna multiplexer from the radio frequency signal on the signal line, wherein the superimposed signal comprises a supply voltage for the antenna assembly and a communication signal.

In a step 304, the communication signal is received by an antenna controller. In a step 305, the antenna controller performs a monitoring and/or a control operation in response to the communication signal.

Figure 4:
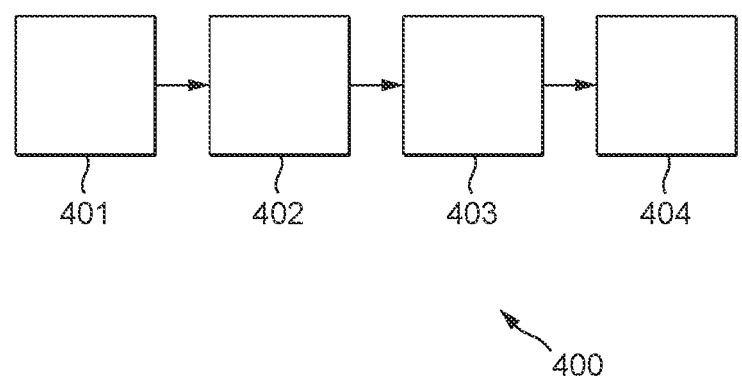
FIG. 4 shows a flowchart of a communication method according to another example embodiment of the disclosure.

FIG. 4 shows a flowchart of a communication method 400 according to one embodiment of the disclosure. The communication method according to FIG. 4 can be applied to the receiver assembly 2, 2' of FIGS. 1 and 2.

In a step 401, a receiver controller generates a communication signal comprising instructions regarding a monitoring and/or a control operation for an antenna assembly.

In a step 402, a receiver voltage supply provides a supply voltage for the antenna assembly via the receiver connector.

In a step 403, a receiver radio frequency circuit receives and processes a radio frequency signal, wherein the radio frequency signal is received via a signal line of the receiver assembly, which signal line is connected via a receiver connector to a single line communication cable. Steps 401 to 403 may occur in any order, the order in which they are presented herein is merely exemplary.

In a step 404, a receiver multiplexer adds the supply voltage and the communication signal onto the radio frequency signal on the signal line of the receiver assembly.

Further features of the methods 300 and 400 may be derived from the description of the embodiments of the system 1 and 1' according to FIGS. 1 and 2.

In a further alternative exemplary embodiment of the method according to the disclosure, an antenna assembly sends one or more further communication signals comprising information regarding a status of the antenna assembly automatically as a host, in case of multiple further communication signals those may be sent by the antenna assembly at a certain rate, e.g., every couple of milliseconds or every couple of seconds or every couple of minutes or at another rate.

The one or more further communication signals may comprise information concerning at least one of the following: an identity of the antenna assembly, e.g., an authentication code, a serial number of the antenna assembly, a temperature of at least one part of the antenna assembly, a received power level, a measured bias voltage and/or bias current drain, a bias setting of the antenna assembly, acknowledge and/or reject status of the antenna assembly or an entity thereof. These one or more further communication signals can be received and processed by a receiver assembly with a receiver controller, which can also react to the received one or more further communication signals from the antenna assembly by sending a communication signal via a superimposed signal to the antenna assembly when an antenna controller of the antenna assembly is quiet and pausing between sending the one or more further communication signals. The communication signal sent from the receiver assembly to the antenna assembly may comprise, for example, control messages instructing the antenna assembly to perform certain monitoring and/or control operations in response to the received communication signal.

It will be appreciated that the disclosure is not limited to the disclosed embodiments and to what has been particularly shown and described hereinabove. Rather, features recited in separate dependent claims or in the description may advantageously be combined. Furthermore, the scope of the disclosure includes those variations and modifications, which will be apparent to those skilled in the art and fall within the spirit of the appended claims. The term "comprising", insofar it was used in the claims or in the description, does not exclude other elements or steps of a corresponding feature or procedure. In case that the terms "a" or "an" were used in conjunction with features, they do not exclude a plurality of such features. Moreover, any reference signs in the claims should not be construed as limiting the scope.

LIST OF REFERENCE SIGNS 1, 1' system
2, 2' receiver assembly
3, 3' antenna assembly
4, 4' receiver controller
receiver voltage supply unit
6, 6' GNSS receiver radio frequency circuit
7, 7' receiver multiplexer
8, 8' receiver connector
9, 9' single line communication cable
10, 10' signal line of the antenna assembly
11, 11' antenna
12, 12' GNSS antenna radio frequency circuit
13, 13' antenna controller
14, 14' antenna multiplexer
15, 15' signal line of the receiver assembly
300 communication method
301-305 method steps
400 communication method
401-404 method steps

The invention claimed is:

1. An antenna assembly, comprising:
a signal line for connecting the antenna assembly to a single line communication cable;
an antenna, arranged to receive a radio frequency signal and to apply the radio frequency signal to the signal line of the antenna assembly;
an antenna multiplexer, arranged to separate a superimposed signal from the radio frequency signal on the signal line, wherein the superimposed signal comprises a supply voltage for the antenna assembly and a communication signal;
a non-volatile memory, arranged to store an authentication code of the antenna assembly; and
an antenna controller, arranged to (i) receive the communication signal and to perform at least one of a monitoring or a control operation in response to the communication signal, and (ii) transmit a response message comprising the authentication code of the antenna assembly on the signal line that is connected to the single line communication cable.

2. The antenna assembly according to claim 1, wherein the at least one of the monitoring or control operation comprises:
determining a status of the antenna assembly,
generating a further communication signal based on the determined status in response to the communication signal, and
sending the further communication signal via the single line communication cable to a receiver assembly.

3. The antenna assembly according to claim 1, further comprising at least one of the following:
a temperature sensor, arranged to measure a temperature of at least one part of the antenna assembly,
a current and/or voltage sensor, arranged to measure at least one of a current or voltage supplied to at least one part of the antenna assembly, and
a signal input power sensor, arranged to measure a signal input power provided to at least one part of the antenna assembly.

4. The antenna assembly according to claim 1, wherein the antenna controller is arranged to communicate as a client in a client-host system.

5. The antenna assembly according to claim 1, wherein the antenna assembly is a global navigation satellite system antenna assembly.

6. The antenna assembly according to claim 1, wherein:
the antenna assembly is arranged to (i) communicate with a receiver assembly via the communication signal and a further communication signal when the antenna assembly is connected via the single line communication cable to the receiver assembly which is arranged to send the communication signal and to receive the further communication signal, and (ii) not communicate with the receiver assembly via the communication signal and the further communication signal when the antenna assembly is connected via the single line communication cable to the receiver assembly which is not arranged to send the communication signal and to receive the further communication signal.

7. A communication method for an antenna assembly, wherein a signal line of the antenna assembly is connected to a single line communication cable, the method comprising:
receiving, by an antenna, a radio frequency signal;
applying, by the antenna, the radio frequency signal to the signal line of the antenna assembly;
separating, by an antenna multiplexer, a superimposed signal from the radio frequency signal on the signal line, wherein the superimposed signal comprises a supply voltage for the antenna assembly and a communication signal;

receiving, by an antenna controller, the communication signal; and performing, by the antenna controller, at least one of a monitoring or a control operation in response to the communication signal, comprising:
  accessing an authentication code of the antenna assembly that is stored in a non-volatile memory of the antenna assembly, and
  transmitting a response message comprising the authentication code of the antenna assembly on the signal line that is connected to the single line communication cable.

8. A receiver-assembly, comprising:
a receiver connector for connecting a signal line of the receiver assembly to a single line communication cable;
a receiver controller, arranged to generate a communication signal comprising instructions regarding at least one of a monitoring or a control operation for an antenna assembly, including instructions to poll an authentication code from the antenna assembly;
a receiver voltage supply, arranged to provide a supply voltage for the antenna assembly via the receiver connector;
a receiver radio frequency circuit, arranged to receive, via the signal line, and process a radio frequency signal; and
a receiver multiplexer, arranged to superimpose the supply voltage and the communication signal that includes the instructions to poll the authentication code from the antenna assembly onto the radio frequency signal on the signal line of the receiver assembly that is connected to the single line communication cable.

9. The receiver assembly according to claim 8, wherein the receiver multiplexer is further arranged to separate a further communication signal from the radio frequency signal on the signal line.

10. The receiver assembly according to claim 8, wherein the receiver controller is arranged to communicate as a host in a client-host system.

11. The receiver assembly according to claim 8, wherein the receiver voltage supply is provided as a part of the receiver controller.

12. A communication method for a receiver assembly, wherein a signal line of the receiver assembly is connected via a receiver connector to a single line communication cable, the method comprising:
  generating, by a receiver controller, a communication signal comprising instructions regarding at least one of a monitoring or a control operation for an antenna assembly, including instructions to poll an authentication code from the antenna assembly;
  providing, by a receiver voltage supply, a supply voltage for the antenna assembly via the receiver connector;
  receiving and processing, by a receiver radio frequency circuit, a radio frequency signal, wherein the radio frequency signal is received via the signal line; and
  adding, by a receiver multiplexer, the supply voltage and the communication signal that includes the instructions to poll the authentication code from the antenna assembly onto the radio frequency signal on the signal line of the receiver assembly that is connected to the single line communication cable.

13. A system comprising a receiver assembly and an antenna assembly, wherein:
the receiver assembly and the antenna assembly are connected via a single line communication cable;
the receiver assembly comprises:
  a receiver connector for connecting a signal line of the receiver assembly to the single line communication cable;
  a receiver controller, arranged to generate a communication signal comprising instructions regarding at least one of a monitoring or control operation for the antenna assembly, including instructions to poll an authentication code from the antenna assembly;
  a receiver voltage supply, arranged to provide a supply voltage for the antenna assembly via the receiver connector;
  a receiver radio frequency circuit, arranged to receive, via the signal line, and process a radio frequency signal; and
  a receiver multiplexer, arranged to superimpose the supply voltage and the communication signal that includes instructions to poll the authentication code from the antenna assembly onto the radio frequency signal on the signal line of the receiver assembly that is connected to the single line communication cable, and
the antenna assembly comprises:
  a signal line for connecting the antenna assembly to the single line communication cable;
  an antenna, arranged to receive the radio frequency signal and to apply the radio frequency signal to the signal line of the antenna assembly;
  an antenna multiplexer, arranged to separate the superimposed signal from the radio frequency signal on the signal line of the antenna assembly, wherein the superimposed signal comprises the supply voltage for the antenna assembly and the communication signal;
  an antenna controller, arranged to receive the communication signal and to perform at least one of the monitoring or control operation in response to the communication signal, comprising:
    accessing the authentication code of the antenna assembly that is stored in a non-volatile memory of the antenna assembly, and
    transmitting a response message comprising the authentication code of the antenna assembly on the signal line that is connected to the single line communication cable.

14. A system according to claim 13, wherein the antenna assembly and the receiver assembly are operable to communicate via the single line communication cable according to a bi-directional single wire communication.

* * * * *